Oct. 25, 1966  J. J. FOLEY  3,280,862
BEARING FOR POWER BAND MEAT SAW
Filed April 7, 1964
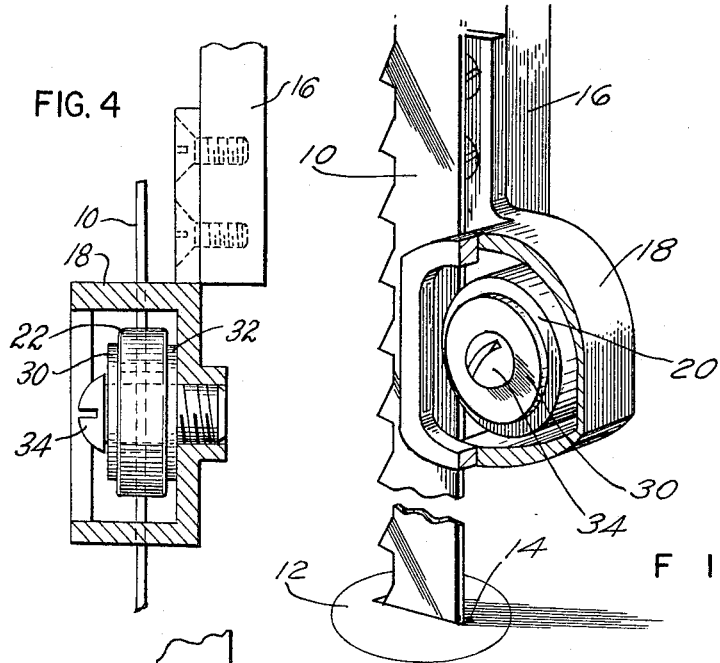
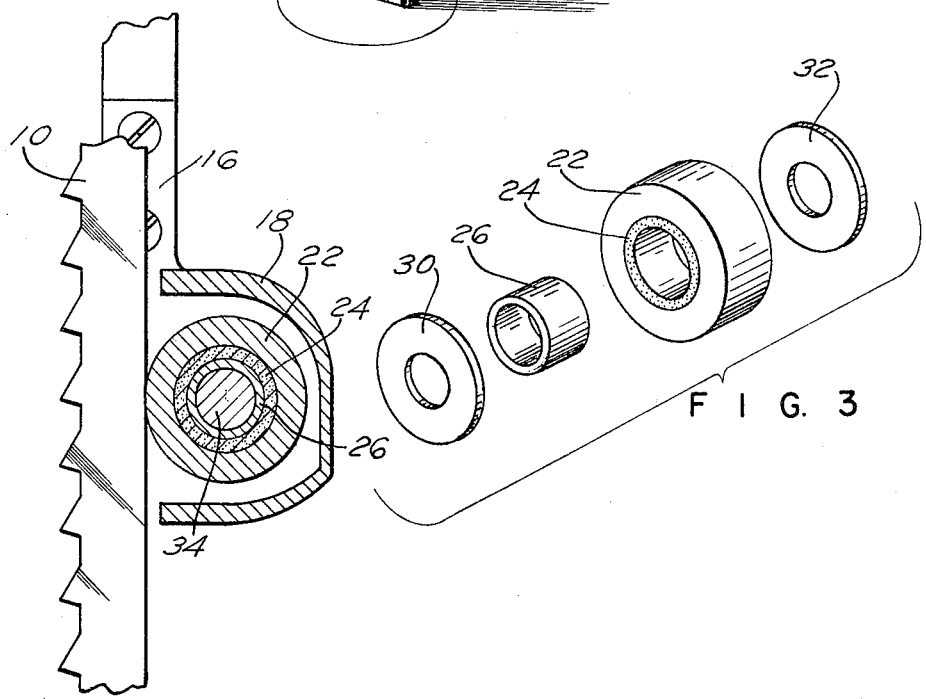
INVENTOR
JOSEPH J. FOLEY
BY
Morse + Altman
ATTORNEYS 3,280,862
BEARING FOR POWER BAND MEAT SAW
Joseph J. Foley, 249 Riverside Drive, Dedham, Mass.
Filed Apr. 7, 1964, Ser. No. 357,871
1 Claim. (Cl. 143—162)

This invention relates to a bearing for the back edge of a band-saw blade such as is a part of a power meat saw. For cutting meat having bones therein, most meat cutters employ a power band saw. The saw blade is an endless band of steel with teeth in one edge thereof. The band passes around two wheels which are mounted respectively above and below a table, a vertical stretch of the band passing through an opening in the table. When the saw is in use, the meat is pushed on the table against the serrated edge of the blade. To take the thrust of the meat on the blade, a roller bearing is mounted against the rear edge of the blade at a point spaced above the table. A second bearing is mounted against the rear edge of the blade at a point below the table. As these roller bearings should turn freely, they are customarily made with ball races packed with grease. Health regulations require that all of the parts of the band saw be thoroughly cleaned at frequent intervals. This is customarily done either by steam or a strong detergent in hot water. A result of these cleansing operations is the leaching out of the grease originally packed in the ball races, and the eventual rusting of the ball bearings which increasingly tend to stick. When the bearing roller drags or sticks, the rapidly moving rear edge of the blade rapidly wears a kerf in the roller which impairs the efficiency of the machine and soon necessitates the replacement of the roller.

According to the present invention, improved rollers are employed which can be steam-cleaned or otherwise thoroughly and repeatedly washed without losing their efficiency. To this end the roller is a ring of hardened steel within which is press-fitted a bushing of porous, lubricant-impregnated bronze, a material of this kind on the market being known as "Oilite." Rotatably fitted within the bushing is a stud on which the roller turns. For a more complete understanding of the invention, reference may be had to the following description thereof, and to the drawing, of which FIGURE 1 is a perspective view of a bearing assembly embodying the invention, and fragments of the saw structure on which it is mounted, part of the bearing housing being broken away;

FIGURE 2 is a sectional view of the bearing, showing its relation to the saw blade;

FIG. 3 is an exploded perspective view of the bearing parts; and

FIGURE 4 is a sectional view of the bearing housing showing the assembled bearing mounted therein.

The roller bearing illustrated on the drawing is shown in its position as the upper bearing in a typical power band meat saw, parts of which are indicated on the drawing. A portion of the vertical stretch of the saw blade 10 is shown, together with a fragment of the table 12, the blade moving downward through a narrow aperture 14 in the table. A frame member 16 extending down from above supports a housing 18 which guides the saw blade 10 and encloses the roller bearing 20.

The bearing 20 comprises a hardened steel ring 22 which is a short, hollow cylinder. Press-fitted within the ring 22 is a self-lubricating bushing 24 which is preferably made of porous bronze impregnated with a suitable lubricant such as any kind of grease. A material of this kind is on the market under the name of "Oilite." The ends of the bushing are substantially flush with the side faces of the ring 22.

The ring and bushing rotate freely on a stud which may comprise a steel tube 26 loosely fitted within the bushing 24 and slightly longer than the bushing so that its ends project beyond the planes of the side faces of the ring 22. To support this tube 26 in fixed position, washers 30 and 32 are placed against the ends of the tube and a bolt 34 is passed through the washers and the tube to clamp the washers tightly against the respective ends of the tube. The diameter of the washers is greater than that of the bushing so that they serve to prevent axial displacement of the ring 22.

A roller bearing constituted as described can be repeatedly steam-cleaned or washed without appreciable loss of its freedom to rotate so that its term of useful service far exceeds that of the conventional bearing which runs on ball races.

I claim:

A roller bearing assembly for a power band meat saw having a frame and a band saw blade, comprising a ring of hardened steel for engaging the rear edge of the saw blade, a self-lubricating bushing of porous, lubricant-impregnated metal press-fitted within said ring, the ends of said bushing being substantially flush with the side faces of said ring, a stud comprising a tube loosely fitted within said bushing, said tube being slightly longer than the axial dimension of said ring and bushing, a washer against each end of said tube, the diameter of each washer being greater than the outer diameter of said bushing, and support means secured to said frame and passing through said tube and clamping said washers tightly against the ends of said tube but permitting free rotation of said ring.

References Cited by the Examiner

UNITED STATES PATENTS

| | | |
|---|---|---|
| 1,816,758 | 7/1931 | Adams. |
| 2,279,887 | 4/1942 | Hathorn _____ 308—18 X |
| 2,585,957 | 2/1952 | Meeker et al. _____ 143—162 X |
| 2,696,410 | 12/1954 | Topanelian. |
| 3,064,698 | 11/1962 | La Force _____ 142—162 |

DONALD R. SCHRAN, *Primary Examiner.*